(12) United States Patent
Katoh et al.

(10) Patent No.: US 10,266,035 B2
(45) Date of Patent: Apr. 23, 2019

(54) VEHICLE AIR-CONDITIONER

(71) Applicant: DENSO CORPORATION, Kariya, Aichi-pref. (JP)

(72) Inventors: Yoshiki Katoh, Kariya (JP); Kazutoshi Kuwayama, Kariya (JP); Masamichi Makihara, Kariya (JP); Norihiko Enomoto, Kariya (JP); Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 154 days.

(21) Appl. No.: 14/903,291

(22) PCT Filed: Jun. 19, 2014

(86) PCT No.: PCT/JP2014/003302
§ 371 (c)(1),
(2) Date: Jan. 7, 2016

(87) PCT Pub. No.: WO2015/004858
PCT Pub. Date: Jan. 15, 2015

(65) Prior Publication Data
US 2016/0288618 A1   Oct. 6, 2016

(30) Foreign Application Priority Data

Jul. 9, 2013   (JP) ................................ 2013-143204

(51) Int. Cl.
*B60H 1/00* (2006.01)
*B60H 1/32* (2006.01)
*F28D 1/053* (2006.01)

(52) U.S. Cl.
CPC ..... *B60H 1/00921* (2013.01); *B60H 1/00335* (2013.01); *B60H 1/3205* (2013.01); *F28D 1/05383* (2013.01)

(58) Field of Classification Search
CPC .............. B60H 1/00921; B60H 1/3205; B60H 1/00335; B60H 1/00899; F28D 1/05383; F25B 25/005
See application file for complete search history.

(56) References Cited

U.S. PATENT DOCUMENTS 6,308,770 B1 * 10/2001 Shikata .............. B60H 1/00064
165/126
2004/0035130 A1   2/2004 Amaral et al.
(Continued)

FOREIGN PATENT DOCUMENTS

JP          09104216 A   *  4/1997
JP          H09104216 A       4/1997
(Continued)

OTHER PUBLICATIONS

International Search Report and Written Opinion (in Japanese with English Translation) for PCT/JP2014/003302, dated Sep. 16, 2014; ISA/JP.

*Primary Examiner* — Emmanuel Duke
(74) *Attorney, Agent, or Firm* — Harness, Dickey & Pierce, P.L.C.

(57) ABSTRACT

A vehicle air-conditioner has a casing, a first heat exchanger, and a second heat exchanger. The casing forms an air passage through which air flows toward inside of a vehicle cabin. The first heat exchanger is housed in the casing and performs a sensible heat exchange between the air flowing in the air passage and a heating medium. The second heat exchanger is housed in the casing and performs a sensible heat exchange between the heating medium and air that has exchanged sensible heat in the first heat exchanger. The first heat exchanger and the second heat exchanger respectively have a plurality of tubes through which the heating medium flows. A longitudinal direction of the plurality of tubes of the (Continued)

COOLING OPERATION first heat exchanger and a longitudinal direction of the plurality of tubes of the second heat exchanger are the same direction as each other.

6 Claims, 6 Drawing Sheets

(56) References Cited

U.S. PATENT DOCUMENTS

| | | |
|---|---|---|
| 2004/0050086 A1 | 3/2004 | Amaral et al. |
| 2004/0050089 A1 | 3/2004 | Amaral |
| 2004/0060316 A1* | 4/2004 | Ito ................... B60H 1/00328 62/324.1 |
| 2004/0089003 A1 | 5/2004 | Amaral et al. |
| 2004/0089014 A1 | 5/2004 | Amaral et al. |
| 2006/0032623 A1 | 2/2006 | Tsubone et al. |
| 2011/0232310 A1* | 9/2011 | Kawashima ....... B60H 1/00785 62/176.1 |
| 2012/0175081 A1* | 7/2012 | Katoh ................ B60H 1/00335 165/104.14 |

FOREIGN PATENT DOCUMENTS

| | | | | |
|---|---|---|---|---|
| JP | 11301254 A | * | 11/1999 | |
| JP | H11301254 A | | 11/1999 | |
| JP | 3237331 B2 | | 12/2001 | |
| JP | 2003533395 A | | 11/2003 | |
| JP | 2004050873 A | * | 2/2004 | ......... B60H 1/00492 |
| JP | 2004050873 A | | 2/2004 | |
| JP | 2012153356 A | | 8/2012 | |

* cited by examiner

HEATING OPERATION

COOLING OPERATION

VEHICLE AIR-CONDITIONER

CROSS REFERENCE TO RELATED APPLICATIONS

This application is a U.S. National Phase Application under 35 U.S.C. 371 of International Application No. PCT/JP2014/003302 filed on Jun. 19, 2014 and published in Japanese as WO 2015/004858 A1 on Jan. 15, 2015. This application is based on and claims the benefit of priority from Japanese Patent Application No. 2013-143204 filed on Jul. 9, 2013. The entire disclosures of all of the above applications are incorporated herein by reference.

TECHNICAL FIELD

The present disclosure relates to a vehicle air-conditioner.

BACKGROUND ART

Conventionally, a vehicle air-conditioner that includes a cooling heat exchanger that cools air to be blown into a vehicle cabin and a heating air exchanger that heats the air to be blown into the vehicle cabin is described in Patent Literature 1.

The cooling heat exchanger exchanges heat between the air to be blown into the vehicle cabin and a low-pressure side refrigerant in a refrigeration cycle, so as to evaporate the low-pressure side refrigerant and cool the air to be blown into the vehicle cabin. That is, the cooling heat exchanger cools the air to be blown into the vehicle cabin by using evaporation latent heat of the low-pressure side refrigerant.

The cooling heat exchanger cools the air to be blown into the vehicle cabin by using evaporation latent heat of the low-pressure side refrigerant. Thus, theoretically, a temperature of the low-pressure side refrigerant is constant in the cooling heat exchanger, and temperature distribution of the air blown from the cooling heat exchanger is not generated.

PRIOR ART LITERATURES

Patent Literature

Patent Literature 1: Japanese Patent No. 3237331

SUMMARY OF INVENTION

The inventors of the subject application have considered to use sensible heat exchangers as the cooling heat exchanger and the heating heat exchanger in the vehicle air-conditioner. In the consideration example, the cooling heat exchanger exchanges heat between the air to be blown into the vehicle cabin and a low-temperature coolant, whereas the heating heat exchanger exchanges heat between the air to be blown into the vehicle cabin and a high-temperature coolant.

In the consideration example, a phase of the coolant does not change in the cooling heat exchanger and the heating heat exchanger. That is, the cooling heat exchanger and the heating heat exchanger respectively cool and heat the air to be blown into the vehicle cabin through sensible heat exchange.

According to the consideration example, the cooling heat exchanger and the heating heat exchanger respectively cool and heat the air to be blown into the vehicle cabin through sensible heat exchange. Accordingly, a temperature of the coolant is not constant but changes in the cooling heat exchanger and the heating heat exchanger. Thus, temperature distribution of the air blown from the cooling heat exchanger and the heating heat exchanger is generated. Therefore, comfort of an occupant in terms of the temperature is possibly degraded.

In view of the above point, it is an objective of the present disclosure to provide a vehicle air-conditioner capable of easily adjusting temperature distribution of a blowing air by exchanging heat of air to be blown into a vehicle cabin in two sensible heat exchangers.

To achieve the above objective, a vehicle air-conditioner of the present disclosure has a casing, a first heat exchanger, and a second heat exchanger. The casing forms an air passage through which air flows toward inside of a vehicle cabin. The first heat exchanger is housed in the casing and performs a sensible heat exchange between the air flowing in the air passage and a heating medium. The second heat exchanger is housed in the casing and performs a sensible heat exchange between the heating medium and air that has exchanged sensible heat in the first heat exchanger. The first heat exchanger and the second heat exchanger respectively have tubes through which the heating medium flows. A longitudinal direction of the tubes of the first heat exchanger and a longitudinal direction of the tubes of the second heat exchanger are the same direction as each other.

With the above configuration, the vehicle air-conditioner of the disclosure exchanges sensible heat of the air to be blown into the vehicle cabin by using the two heat exchangers. In addition, a direction in which temperature distribution of a blowing air in the first heat exchanger is generated and a direction in which temperature distribution of the blowing air in the second heat exchanger is generated can be the same direction. Thus, temperature distribution of conditioned air that is obtained by the first heat exchanger and the second heat exchanger can easily be adjusted.

DESCRIPTION OF EMBODIMENTS

Figure 1:
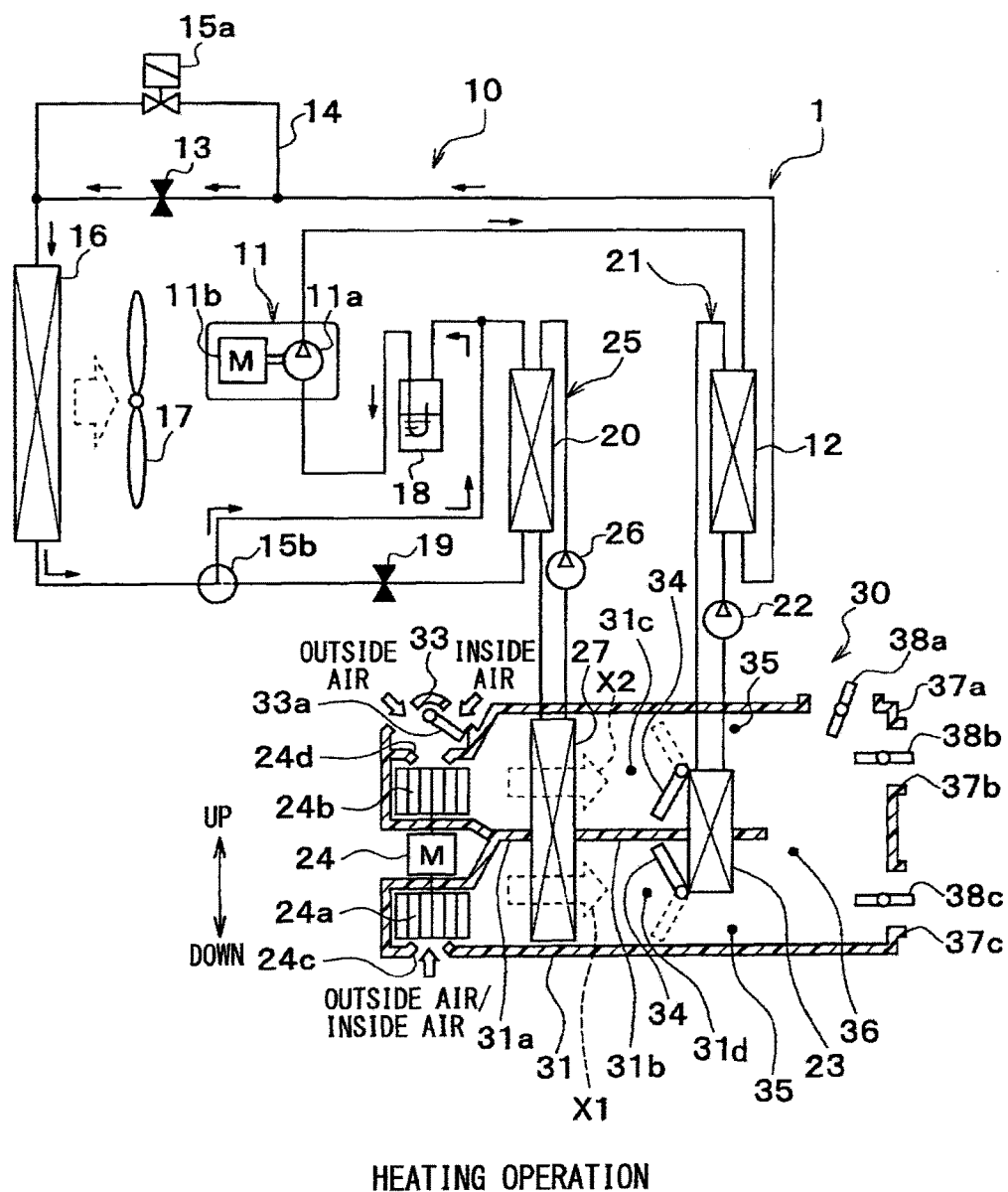
FIG. 1 is an overall configuration diagram of a vehicle air-conditioner in a first embodiment and shows a state during a heating operation.

A description will hereinafter be made on embodiments on the basis of the drawings. It should be noted that, in each of the following embodiments, portions that are mutually the same or equivalent are denoted by the same reference signs in the drawings.

First Embodiment

A vehicle air-conditioner 1 shown in FIG. 1 can be applied not only to a normal engine vehicle that obtains traveling drive power from an engine (i.e., an internal combustion engine) but also to various types of vehicles, such as a hybrid vehicle and an electric vehicle.

In the vehicle air-conditioner 1, a heat pump cycle 10 (i.e., a refrigeration cycle) heats or cools air to be blown into a vehicle cabin as an air-conditioning target space. Thus, the heat pump cycle 10 is capable of performing a heating operation (i.e., a heat up operation) in which the air to be blown into the vehicle cabin as a heat exchange target fluid is heated so as to heat the inside of the vehicle cabin, and a cooling operation (i.e., a refrigerating operation), in which the air to be blown into the vehicle cabin is refrigerated so as to cool the vehicle cabin, by switching refrigerant channels.

Figure 2:
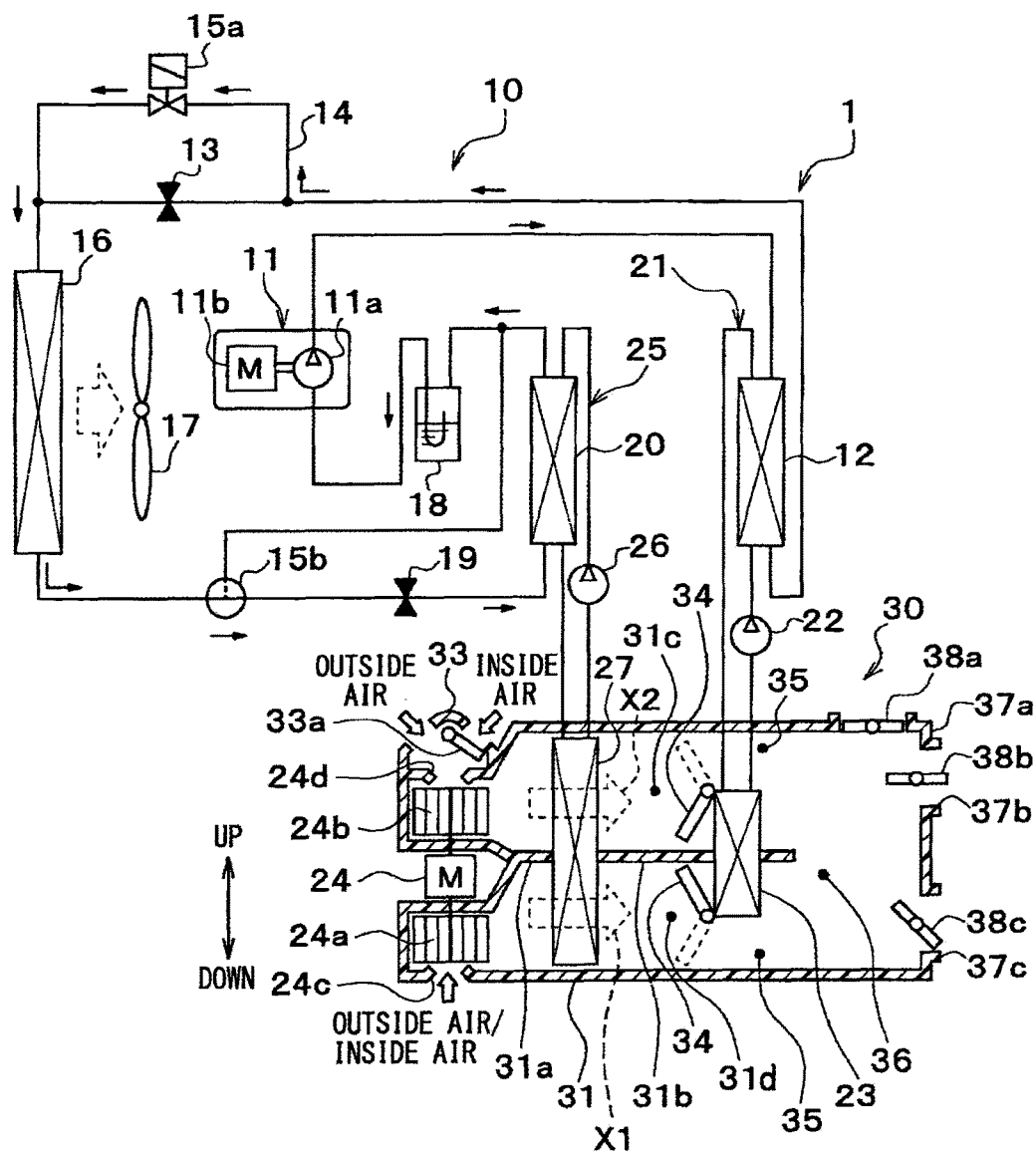
FIG. 2 is an overall configuration diagram of the vehicle air-conditioner in the first embodiment and shows a state during a cooling operation.

In FIG. 1, a flow of a refrigerant during the heating operation is indicated by solid arrows. In FIG. 2, a flow of the refrigerant during the cooling operation is indicated by solid arrows.

An HFC-based refrigerant (more specifically, R134a) is adopted as the refrigerant in the heat pump cycle 10, and a subcritical refrigeration cycle in which pressure of a high-pressure side refrigerant does not exceed critical pressure of the refrigerant is configured. An HFO-based refrigerant (more specifically, R1234yf) or the like can be adopted as long as the refrigerant constitutes the subcritical refrigeration cycle. Refrigerator oil for lubricating a compressor 11 is mixed in the refrigerant, and a part of the refrigerator oil circulates through the cycle together with the refrigerant.

The compressor 11 is a refrigerant compression section that draws, compresses, and discharges the refrigerant in the heat pump cycle 10, and is arranged in an engine room of the vehicle. The compressor 11 is an electric compressor in which a fixed-capacity-type compressor 11a with fixed discharging capacity is driven by an electric motor 11b. Any of various types of compression mechanisms, such as a scroll-type compression mechanism and a vane-type compression mechanism, can be adopted as the fixed-capacity-type compressor 11a.

The electric motor 11b is a discharge ability changing section that changes a discharge ability of the compressor 11. The refrigerant discharge ability of the compressor 11 is changed by rotational speed control of the electric motor 11b. Any type of an AC motor and a DC motor can be adopted as the electric motor 11b.

A refrigerant inlet side of a condenser 12 is connected to a refrigerant discharge port of the compressor 11. The condenser 12 is a heating heat exchanger that exchanges heat between a high-temperature, high-pressure refrigerant discharged from the compressor 11 and a coolant, condenses the high-temperature, high-pressure refrigerant, and heats the coolant.

The coolant is a fluid as a heating medium. In this embodiment, a liquid that at least contains ethylene glycol, dimethyl polysiloxane, or a nano fluid, or an antifreeze liquid is used as the coolant.

A heating fixed throttle 13 is connected to a refrigerant outlet side of the condenser 12. The heating fixed throttle 13 is a decompression section for the heating operation that decompresses and expands the refrigerant flowing from the condenser 12 during the heating operation. An orifice, a capillary tube, or the like can be adopted as the heating fixed throttle 13.

A refrigerant inlet side of an outdoor heat exchanger 16 is connected to an outlet side of the heating fixed throttle 13. The outdoor heat exchanger 16 is a refrigerant/outside air heat exchanger that performs a heat exchange between the low-pressure refrigerant, which is decompressed in the heating fixed throttle 13, and outside air, which is supplied from a blower fan 17, and is arranged in the engine room of the vehicle.

The outdoor heat exchanger 16 functions as an evaporator that exhibits a heat absorbing action by evaporating the low-pressure refrigerant during the heating operation, and functions as a heat radiator that radiates heat from the high-pressure refrigerant during the cooling operation.

The blower fan 17 is an electric blower, a rotational speed of which (i.e., a blowing air volume of which) is controlled by an input control voltage. The blower fan 17 is an air volume changing section that changes the volume of the air to be blown to the outdoor heat exchanger 16.

A fixed-throttle bypass passage 14 is connected to the refrigeration outlet side of the condenser 12. The fixed-throttle bypass passage 14 is a bypass section that makes the refrigerant flowed from the condenser 12 bypass the heating fixed throttle 13 and introduces the refrigerant to the outdoor heat exchanger 16.

An opening/closing valve 15a is arranged in the fixed-throttle bypass passage 14. The opening/closing valve 15a is an electromagnetic valve, opening/closing operations of which are controlled by an input control voltage. The opening/closing valve 15a is an opening/closing section that opens or closes the fixed-throttle bypass passage 14.

The opening/closing valve 15a is a refrigerant channel switching section that switches the refrigerant channel of the heat pump cycle 10. Pressure loss that occurs when the refrigerant passes the opening/closing valve 15a is extremely smaller than pressure loss that occurs when the refrigerant passes the heating fixed throttle 13. Thus, the refrigerant flowing from the condenser 12 flows into the outdoor heat exchanger 16 via the fixed-throttle bypass passage 14 when the opening/closing valve 15a is opened, and flows into the outdoor heat exchanger 16 via the heating fixed throttle 13 when the opening/closing valve 15a is closed.

An electric three-way valve or the like may be adopted as the refrigerant channel switching section, instead of the opening/closing valve 15a. The electric three-way valve as the refrigerant channel switching section only needs to switch between a refrigerant circuit that connects the outlet side of the condenser 12 and the inlet side of the heating fixed throttle 13 and a refrigerant circuit that connects the outlet side of the condenser 12 and the inlet side of fixed-throttle bypass passage 14.

An electric three-way valve 15b is connected to an outlet side of the outdoor heat exchanger 16. The three-way valve 15b is an electromagnetic valve, actuation of which is controlled by an input control voltage. The three-way valve 15b is a refrigerant channel switching section that switches the refrigerant channel of the heat pump cycle 10.

The three-way valve 15b switches to a refrigerant channel that connects the outlet side of the outdoor heat exchanger 16 and an inlet side of an accumulator 18 during the heating operation, and switches to a refrigerant channel that connects the outlet side of the outdoor heat exchanger 16 and an inlet side of a cooling fixed throttle 19 during the cooling operation.

The accumulator 18 is a gas-liquid separator for the low-pressure side refrigerant that separates gas and a liquid of the refrigerant flowing thereinto and stores a surplus refrigerant in the cycle. The cooling fixed throttle 19 is a decompression section for the cooling operation that decompresses and expands the refrigerant flowing from the outdoor heat exchanger 16 during the cooling operation. A basic configuration of the cooling fixed throttle 19 is similar to that of the heating fixed throttle 13.

A refrigerant inlet side of an evaporator 20 is connected to an outlet side of the cooling fixed throttle 19. The evaporator 20 is a cooling heat exchanger that evaporates the low-pressure refrigerant and cools the coolant by performing a heat exchange between the coolant and the low-pressure refrigerant that is decompressed in the cooling fixed throttle 19. The inlet side of the accumulator 18 is connected to a refrigerant outlet side of the evaporator 20.

A suction side of the compressor 11 is connected to a gas-phase refrigerant outlet of the accumulator 18. The accumulator 18 restricts a liquid-phase refrigerant from being drawn into the compressor 11, so as to prevent liquid compression by the compressor 11.

The condenser 12 is arranged in a first coolant circuit 21. The first coolant circuit 21 is a circuit through which the coolant is circulated. A first pump 22 for circulating the coolant is arranged in the first coolant circuit 21. The first pump 22 is an electric pump, a rotational speed of which (i.e., a coolant circulation flow rate of which) is controlled by an input control voltage.

A heater core 23 is arranged in the first coolant circuit 21. The heater core 23 is a heating heat exchanger that heats the air to be blown into the vehicle cabin by performing a heat exchange between the coolant heated in the condenser 12 and the air blown from a blower 24. The heater core 23 is a sensible heat exchanger (i.e., a second heat exchanger) that performs a sensible heat exchange between the coolant (i.e., the heating medium) flowing in the heater core 23 and the air, which is to be blown into the vehicle cabin after exchanging sensible heat with the coolant flowing in a cooler core 27.

The evaporator 20 is arranged in a second coolant circuit 25. The second coolant circuit 25 is a circuit through which the coolant is circulated. A second pump 26 for circulating the coolant is arranged in the second coolant circuit 25. The second pump 26 is an electric pump, a rotational speed of which (i.e., a coolant circulation flow rate of which) is controlled by an input control voltage.

The cooler core 27 is arranged in the second coolant circuit 25. The cooler core 27 is a cooling heat exchanger that heats the air to be blown into the vehicle cabin by performing a heat exchange between the coolant heated in the evaporator 20 and the air blown from the blower 24. The cooler core 27 is a sensible heat exchanger (i.e., a first heat exchanger) that exchanges sensible heat between the coolant (i.e., the heating medium) flowing in the cooler core 27 and the air flowing in a casing 31 and to be blown into the vehicle cabin.

The heater core 23, the blower 24, and the cooler core 27 are housed in the casing 31 of an indoor air-conditioning unit 30. The indoor air-conditioning unit 30 is arranged on the inside of a dashboard (i.e., an instrument panel) at the forefront on the inside of the vehicle cabin. An up-down arrow in FIG. 1 indicates an up-down direction (i.e., a gravitational direction) of the indoor air-conditioning unit 30 in an in-vehicle mounted state.

The casing 31 forms an outer shell of the indoor air-conditioning unit 30. The casing 31 forms an air passage of the air to be blown into the vehicle cabin on the inside thereof. The casing 31 is molded using a resin (e.g., polypropylene) that has a certain degree of elasticity and superior strength.

The blower 24 is an electric blower in which two centrifugal multi-blade fans (i.e., sirocco fans) 24a, 24b housed in different scroll casings are driven and rotated by a single electric motor. A rotational shaft of the electric motor extends in the substantially up-down direction, and the first centrifugal multi-blade fan 24a is arranged below the second centrifugal multi-blade fan 24b. A rotational speed (i.e., a blowing air volume) of the blower 24 is controlled by an input control voltage.

An inside/outside air switching device (not shown) is arranged in a first air suction port 24c that is formed in the scroll casing for accommodating the first centrifugal multi-blade fan 24a.

An inside/outside air switching device 33 is arranged on an airflow upstream side of a second air suction port 24d that is formed in the scroll casing for accommodating the second centrifugal multi-blade fan 24b. The inside/outside air switching device 33 is an introducing air switching section that switches between and introduces vehicle cabin inside air (i.e., the inside air) and vehicle cabin outside air (i.e., the outside air) to the second air suction port 24d. The inside/outside air switching device 33 is formed with an inside air introduction port through which the inside air is introduced into the casing 31 and an outside air introduction port through which the outside air is introduced thereinto.

An inside/outside air switching door 33a is arranged on the inside of the inside/outside air switching device 33. The inside/outside air switching door 33a is an air volume ratio adjustment section that continuously adjusts an opening areas of the inside air introduction port and the outside air introduction port so as to change an air volume ratio between an air volume of the inside air and an air volume of the outside air. The inside/outside air switching door 33a is driven by a servomotor (not shown). Actuation of the servomotor is controlled by an input control signal.

Although not shown, a structure of an inside/outside air switching device that is arranged on an airflow upstream side of the first air suction port 24c is similar to a structure of the inside/outside air switching device 33 that is arranged on the airflow upstream side of the second air suction port 24d. The inside air is basically introduced into the first air suction port 24c. However, the first air suction port 24c is switchable such that the outside air is introduced thereinto.

When the inside/outside air switching device 33 introduces the outside air into the casing 31, a temperature of a first air that is blown from the first centrifugal multi-blade fan 24a becomes different from a temperature of a second air that is blown from the second centrifugal multi-blade fan 24b.

The outside air temperature becomes lower than the inside air temperature during the heating operation to heat the inside of the vehicle cabin when the outside air temperature is low. Thus, when the inside/outside air switching device 33 introduces the outside air into the casing 31 during the heating operation, the temperature of the first air that is blown from the first centrifugal multi-blade fan 24a becomes higher than the temperature of the second air that is blown from the second centrifugal multi-blade fan 24b.

On an airflow downstream side of the blower 24, the cooler core 27 and the heater core 23 are arranged in this order with respect to flow directions X1, X2 of the air to be blown into the vehicle cabin. In other words, the heater core 23 is arranged on a downstream side in the flow direction of the air to be blown into the vehicle cabin with respect to the cooler core 27.

A first partition plate 31a is provided in a range of the air passage in the casing 31 from the airflow downstream side of the blower 24 to an airflow upstream side of the cooler core 27. The first partition plate 31a is an air introducing section that introduces the air blown from the second centrifugal multi-blade fan 24b to an upper portion of the cooler core 27 and introduces the air blown from the first centrifugal multi-blade fan 24a to a lower portion of the cooler core 27.

A second partition plate 31b is provided in a range of the air passage in the casing 31 from an airflow downstream side of the cooler core 27 to an airflow upstream side of the heater core 23. The second partition plate 31b is an air introducing section that introduces the air blown from the upper portion of the cooler core 27 to an upper portion of the heater core 23 and introduces the air blown from the lower portion of the cooler core 27 to a lower portion of the heater core 23.

That is, the first partition plate 31a and the second partition plate 31b partition the air passage in the casing 31 into a first air passage 31c and a second air passage 31d.

The first air passage 31c is an inside/outside air passage (i.e., an inside air passage or an outside air passage) that introduces the air (i.e., the inside air or the outside air) introduced from the inside/outside air switching device 33 to the upper portion of the cooler core 27 and the upper portion of the heater core 23.

The second air passage 31d is an inside air passage that introduces the inside air introduced from the second air suction port 24c to the lower portion of the heater core 23.

A bypass passage 35 is formed above the heater core 23 in the first air passage 31c. The bypass passage 35 is also formed below the heater core 23 in the second air passage 31d. The bypass passage 35 is a bypass section in which the air after passing through the cooler core 27 flows while bypassing the heater core 23.

An air-mix door 34 is arranged in the bypass passage 35. The air-mix door 34 is an air volume ratio adjustment section that adjusts an air volume ratio between a volume of the air, which passes through the heater core 23 after passing through the cooler core 27, and a volume of the air, which passes through the bypass passage after passing through the cooler core 27.

The air-mix door 34 is driven by a servomotor (not shown). Actuation of the servomotor is controlled by an input control signal.

A merging space 36 is provided on an airflow downstream side of the heater core 23 and the bypass passage 35. The merging space 36 is a space in which the air that is heated by exchanging heat with the coolant in the heater core 23 and the air that passes through the bypass passage 35 and is not heated are merged.

Opening holes 37a, 37b, 37c are arranged in a lowermost stream portion of the airflow in the casing 31. The opening holes 37a, 37b, 37c are a blowoff section blowing the air that has merged in the merging space 36 to the inside of the vehicle cabin as a cooling target space.

As the opening holes 37a, 37b, 37c, a defroster opening hole 37a, a face opening hole 37b, and a foot opening hole 37c are provided in this order beginning at the top. The defroster opening hole 37a is an opening hole for blowing air-conditioned air toward an inside surface of a front window glass of the vehicle.

The face opening hole 37b is an opening hole for blowing the air-conditioned air toward an upper body of an occupant in the vehicle cabin. The foot opening hole 37c is an opening hole for blowing the air-conditioned air toward feet of the occupant.

A defroster door 38a is arranged airflow upstream of the defroster opening hole 37a. The defroster door 38a is an opening area adjustment section that adjusts an opening area of the defroster opening hole 37a.

A face door 38b is arranged airflow upstream of the face opening hole 37b. The face door 38b is an opening area adjustment section that adjusts an opening area of the face opening hole 37b.

A foot door 38c is arranged airflow upstream of the foot opening hole 37c. The foot door 38c is an opening area adjustment section that adjusts an opening area of the foot opening hole 37c.

The defroster door 38a, the face door 38b, and the foot door 38c are each a blowing mode switching section that switches a blowing mode. The defroster door 38a, the face door 38b, and the foot door 38c are driven by a servomotor (not shown) via a link mechanism or the like. Actuation of the servomotor is controlled by an input control signal.

An airflow downstream side of the defroster opening hole 37a is connected to a defroster outlet that is provided in the vehicle cabin via a duct for forming an air passage. An airflow downstream side of the face opening hole 37b is connected to a face outlet that is provided in the vehicle cabin via a duct for forming an air passage. An airflow downstream side of the foot opening hole 37c is connected to the foot outlet that is provided in the vehicle cabin via a duct for forming an air passage.

Figure 3:
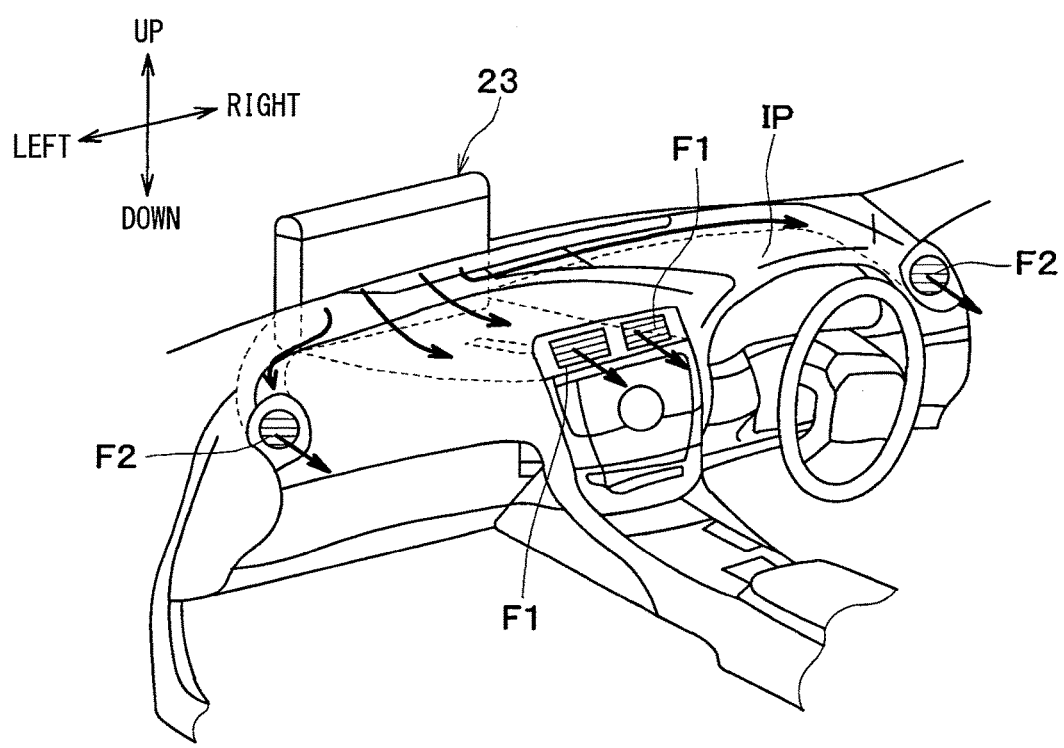
FIG. 3 is a perspective view that shows an arrangement of a face outlet in the first embodiment.

For example, the face opening hole is connected to a front face outlet F1 and a side face outlet F2 shown in FIG. 3. The front face outlet F1 is provided in a central portion of an instrument panel IP in a right-left direction, whereas the side face outlet F2 is provided at ends of the instrument panel IP in the right-left direction.

The front face outlet F1 and the side face outlet F2 are each provided at plural positions for a driver seat side and a passenger seat side. For example, during the heating operation, the air heated in a heat exchange region on the driver seat side of the heater core 23 is mainly blown to the driver seat side, whereas the air heated in a heat exchange region on the passenger seat side of the heater core 23 is mainly blown to the passenger seat side.

Figure 4:
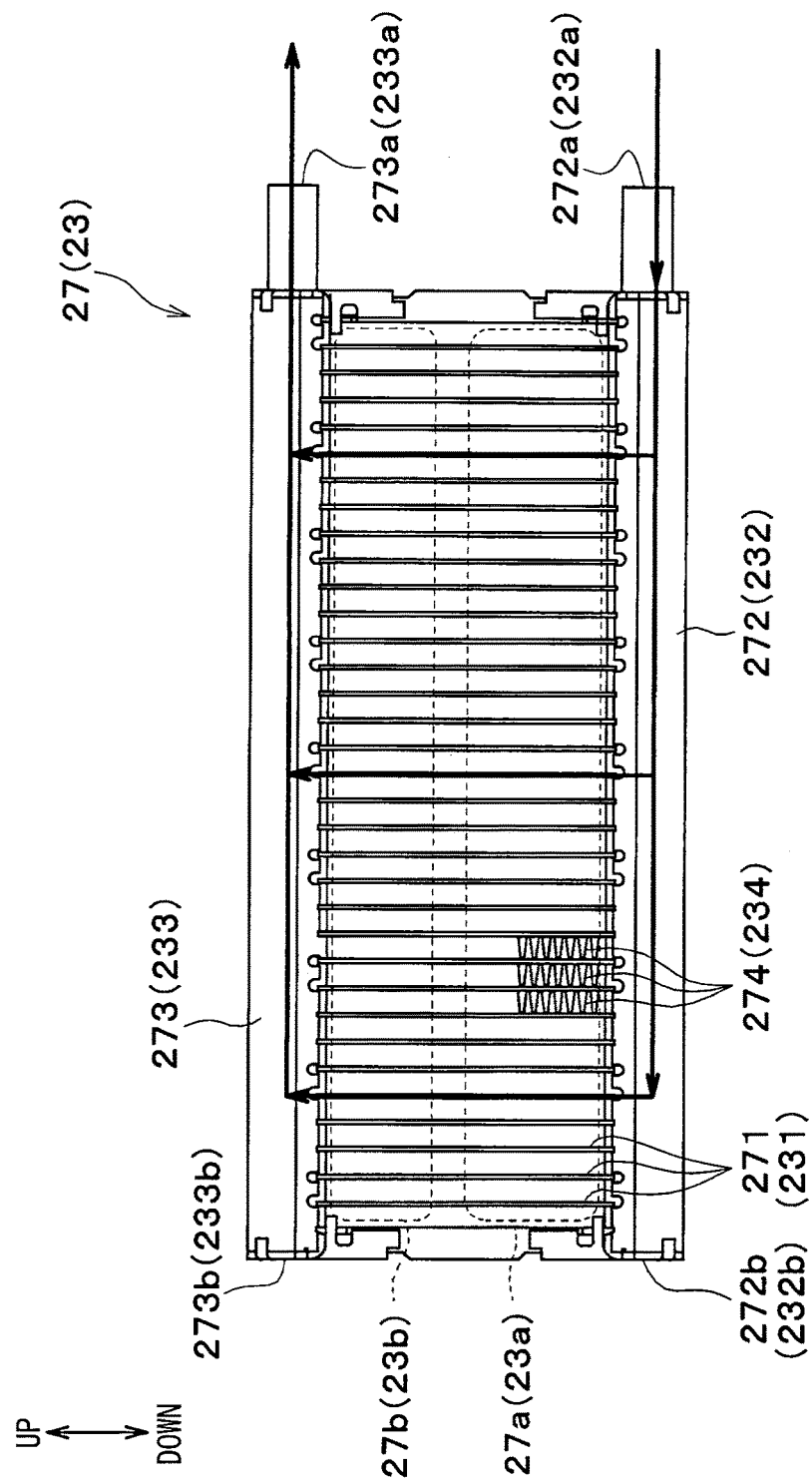
FIG. 4 is a front view of a cooler core (a heater core) in the first embodiment.

Basic configurations of the cooler core 27 and the heater core 23 are the same. Thus, the cooler core 27 is shown in FIG. 4. Reference signs that correspond to the heater core 23 are provided in parentheses in FIG. 4, and an illustration of the heater core 23 is omitted.

An up-down arrow in FIG. 4 indicates the vehicle up-down direction (i.e., the gravitational direction) in a state that the cooler core 27 (the heater core 23) is mounted in the casing 31 of the indoor air-conditioning unit 30.

The cooler core 27 has plural tubes 271, a pair of header tanks 272, 273, and the like. Each of the tubes 271 forms a channel through which the coolant flows. One of the paired header tanks 272, 273 is arranged at an end in a longitudinal direction of each of the plural tubes 271, whereas the other of the paired header tanks 272, 273 is arranged at the other end in the longitudinal direction of each of the plural tubes 271. The paired header tanks 272, 273 each collect or distribute the coolant flowing in the plural tubes 271.

The cooler core 27 is an all-path type in which flow directions of the coolant flowing in the tubes 271 are all the same, and is constructed as a tank-and-tube type heat exchanger. The longitudinal direction of the tube 271 is the same direction as the vehicle up-down direction (i.e., the gravitational direction) when the cooler core 27 is viewed in a front-rear direction of the vehicle.

The tube 271 is a flat tube that is made of metal with a superior heat transfer property (e.g., an aluminum alloy) and in which a cross section perpendicular to the flow direction of the coolant flowing therethrough is in a flat shape. The tube 271 is arranged such that a planar surface (i.e., a flat surface) formed on an outer surface thereof is parallel to the flow directions X1, X2 of the air to be blown into the vehicle cabin. Either a flat tube with a single hole or that with multiple holes may be adopted as the tube 271.

The plural tubes 271 are arranged and stacked in a horizontal direction such that the planar surfaces of the tubes 271 are parallel to each other. An air passage through which the air to be blown into the vehicle cabin flows is formed between the adjacent tubes 271. A fin 274 that promotes heat exchange between the coolant and the air to be blown into the vehicle cabin is arranged between the adjacent tubes 271.

The fin 274 is a corrugated fin that is formed by bending a thin plate member made of the same material as the tube 271 in a wave shape, and a top portion thereof is braze-joined to the planar surface of the tube 271. The fin 274 is arranged in a substantially whole region between the adjacent tubes 271. In FIG. 4, only a portion of the fin 274 is shown for convenience of illustration.

The header tanks 272, 273 are each a cylindrical member formed in a shape that extends in a stacking direction of the plural tubes 271. In this embodiment, the header tank 272, which is arranged airflow upstream of the plural tubes 271, is used as a coolant distributing header tank, whereas the header tank 273, which is arranged airflow downstream of the plural tubes 271, is used as a coolant collecting header tank.

The header tanks 272, 273 are each constructed as a split-type header tank and formed of the same material as the tube 271. The header tanks 272, 273 are each formed in the cylindrical shape and each have a plate member, to which the ends in the longitudinal direction of each of the tubes 271 are braze-joined, and a tank member that is combined with the plate member. The header tanks 272, 273 may each be formed of a tubular member or the like.

A coolant inflow port 272a through which the coolant flows into the header tank 272 is provided at an end of the header tank 272. The other end of the header tank 272 is closed by a tank cap 272b as a closing member.

A coolant outflow port 273a through which the coolant flows out of the inside of the header tank 273 is provided at an end of the header tank 273. The other end of the header tank 273 is closed by a tank cap 273b as a closing member.

In the cooler core 27, as indicated by thick arrows in FIG. 4, the coolant cooled in the evaporator 20 flows into the header tank 272 via the coolant inflow port 272a and is distributed to each of the tubes 271. Then, the coolant, which flows into the tube 271, exchanges heat with the air that is to be blown into the vehicle cabin when flowing in the tube 271, and flows out of the tube 271. The coolant flowing from the tube 271 is collected in the header tank 273 and flows out therefrom via the coolant outflow port 273a.

At this time, the temperature of the coolant flowing in the tube 271 increases while the coolant exchanges heat with the air to be blown into the vehicle cabin in the tube 271. Accordingly, the temperature of the air, which is to be blown into the vehicle cabin after exchanging heat in a downstream portion of the tube 271 in a flow direction of the coolant, becomes higher than that of the air, which is to be blown into the vehicle cabin after exchanging heat in an upstream portion of the tube 271 in the flow direction of the coolant.

Thus, in the cooler core 27, the coolant flowing in a second heat exchange region 27b that is positioned above the second partition plate 31b (refer FIG. 1, FIG. 2) has a higher temperature than the coolant flowing in a first heat exchange region 27a that is positioned below the second partition plate 31b.

As being denoted by the reference signs in parentheses in FIG. 4, the heater core 23 has plural tubes 231 and a pair of header tanks 232, 233 in a similar manner to the cooler core 27. The tube 231 forms a channel through which the coolant flows. One of the paired header tanks 232, 233 is arranged at an end of each of the plural tubes 231 in the longitudinal direction, whereas the other of the paired header tanks 232, 233 is arranged at the other end of each of the plural tubes 231 in the longitudinal direction. The paired header tanks 232, 233 each collect or distribute the coolant flowing in the tubes 231.

The heater core 23 is the all-path type in which the flow directions of the coolant flowing in the tubes 231 are all the same, and is constructed as the tank-and-tube type heat exchanger. The longitudinal direction of the tube 231 is the same direction as the vehicle up-down direction (i.e., the gravitational direction) when the heater core 23 is viewed in the front-rear direction of the vehicle.

The tube 231 is a flat tube that is made of metal with a superior heat transfer property (e.g., the aluminum alloy) and in which a cross section perpendicular to the flow direction of the coolant flowing therethrough is in a flat shape. The tube 231 is arranged such that a planar surface (i.e., a flat surface) formed on an outer surface thereof is parallel to the flow directions X1, X2 of the air to be blown into the vehicle cabin. Either a flat tube with a single hole or that with multiple holes may be adopted as the tube 231.

The plural tubes 231 are arranged and stacked in the horizontal direction such that the planar surfaces of the tubes 231 are parallel to each other. An air passage through which the air to be blown into the vehicle cabin flows is formed between the adjacent tubes 231. A fin 234 that promotes heat exchange between the coolant and the air to be blown into the vehicle cabin is arranged between the adjacent tubes 231.

The fin 234 is the corrugated fin that is formed by bending a thin plate member made of the same material as the tube 231 in the wave shape, and a top portion thereof is braze-joined to the planar surface of the tube 231. The fin 234 is arranged in a substantially whole region between the adjacent tubes 231. In FIG. 4, only a portion of the fin 234 is shown for convenience of illustration.

The header tanks 232, 233 are each a cylindrical member formed in a shape that extends in a stacking direction of the plural tubes 231. In this embodiment, the header tank 232, which is arranged upstream of the plural tubes 231, is used as a coolant distributing header tank, whereas the header tank 233, which is arranged downstream of the plural tubes 231, is used as a coolant collecting header tank.

The header tanks 232, 233 are each constructed as the split-type header tank and formed of the same material as the tube 231. The header tanks 232, 233 are each formed in a cylindrical shape and each have a plate member, to which the ends in the longitudinal direction of each of the tubes 231 are braze-joined, and a tank member that is combined with the plate member. The header tanks 232, 233 may each be formed of a tubular member or the like.

A coolant inflow port 232a through which the coolant flows into the header tank 232 is provided at an end of the header tank 232. The other end of the header tank 232 is closed by a tank cap 232b as the closing member.

A coolant outflow port 233a through which the coolant flows out of the inside of the header tank 233 is provided at an end of the header tank 233. The other end of the header tank 233 is closed by a tank cap 233b as the closing member.

In the heater core 23, as indicated by the thick arrows in FIG. 4, the coolant heated in the condenser 12 flows into the header tank 232 via the coolant inflow port 232a and is distributed to each of the tubes 231. Then, the coolant, which flows into the tube 231, exchanges heat with the air to be blown into the vehicle cabin when flowing in the tube 231 and flows out of the tube 231. The coolant flowing from the tube 231 is collected in the header tank 233 and flows out therefrom via the coolant outflow port 233a.

At this time, the temperature of the coolant flowing in the tube 231 decreases while the coolant exchanges heat with the air to be blown into the vehicle cabin in the tube 231. Accordingly, the temperature of the air, which is to be blown into the vehicle cabin after exchanging heat in a downstream portion in the tube 231 in the flow direction of the coolant, becomes lower than that of the air, which is to be blown into the vehicle cabin after exchanging heat in an upstream portion of the tube 231 in the flow direction of the coolant.

Thus, in the heater core 23, the coolant flowing in a second heat exchange region 23b that is positioned above the second partition plate 31b (refer FIG. 1, FIG. 2) has a lower temperature than the coolant flowing in a first heat exchange region 23a that is positioned below the second partition plate 31b.

Figure 5:
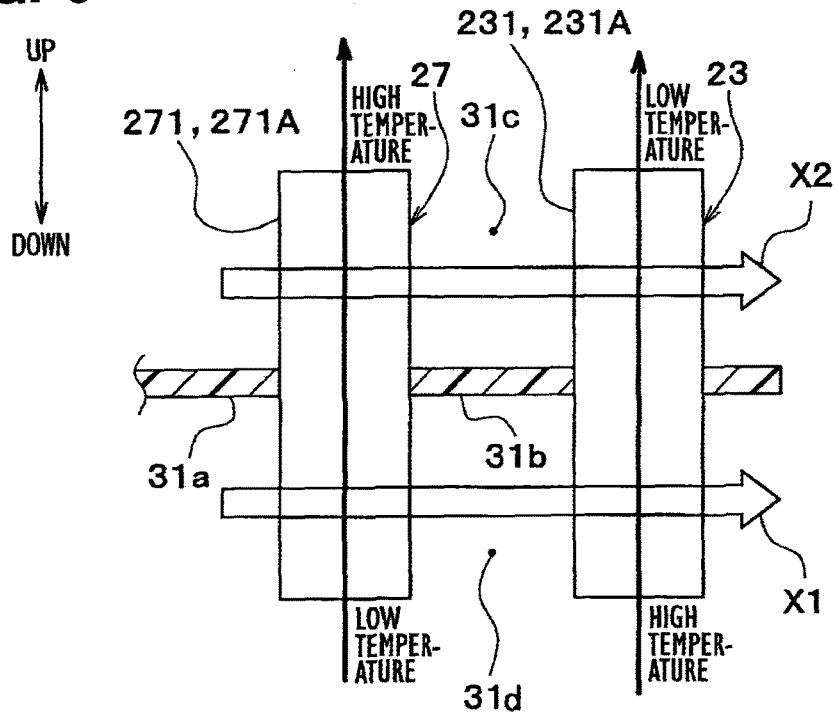
FIG. 5 is a schematic view that shows a coolant flow direction in the cooler core and the heater core in the first embodiment.

FIG. 5 is a schematic view in which the cooler core 27 and the heater core 23 in the casing 31 are viewed in the right-left direction of the vehicle. The longitudinal direction of the tube 271 in the cooler core 27 and the longitudinal direction of the tube 231 in the heater core 23 are the same direction as each other.

The longitudinal direction of the tube 271 in the cooler core 27 and the longitudinal direction of the tube 231 in the heater core 23 correspond to the up-down direction of the vehicle (i.e., the gravitational direction) when viewed in the front-rear direction of the vehicle (i.e., the right-left direction in FIG. 5).

In this example, the longitudinal direction of the tube 271 in the cooler core 27 and the longitudinal direction of the tube 231 in the heater core 23 correspond to the up-down direction of the vehicle (i.e., the gravitational direction) when viewed in the right-left direction of the vehicle (i.e., a direction perpendicular to a sheet of FIG. 5). The longitudinal direction of the tube 271 in the cooler core 27 and the longitudinal direction of the tube 231 in the heater core 23 may be inclined in the front-rear direction of the vehicle with respect to the up-down direction of the vehicle (i.e., the gravitational direction) when viewed in the right-left direction of the vehicle.

The tubes 271 of the cooler core 27 are arranged in a row in the flow directions X1, X2 of the air to be blown into the vehicle cabin and constitute a single path 271A (i.e., a first path). The coolant flows upward in the path 271A. In other words, the path 271A is configured by the plural tubes 271 (i.e., a tube group) in which the coolants flow in the same direction as each other. The coolant, which flows into the cooler core 27, flows upward in the path 271A and flows out of the cooler core 27.

The tubes 231 of the heater core 23 are arranged in a row in the flow directions X1, X2 of the air to be blown into the vehicle cabin and constitute a single path 231A (i.e., a second path). The coolant flows upward in the path 231A. In other words, the path 231A is configured by the plural tubes 231 (i.e., a tube group) in which the coolants flow in the same direction as each other. The coolant, which flows into the heater core 23, flows upward in the path 231A and flows out of the heater core 23.

In the path 271A of the cooler core 27 and the path 231A of the heater core 23, the coolants flow in the same direction as each other. More specifically, the coolants flow upward in the path 271A of the cooler core 27 and the path 231A of the heater core 23.

Next, electric control units of this embodiment will be described. A controller is configured by a well-known microcomputer that includes a CPU, a ROM, a RAM, and the like and a peripheral circuit thereof. The controller performs various types of computations and processes on the basis of an air-conditioning control program stored in the ROM thereof and controls actuation of various types of air-conditioning control equipment connected to an output side.

As various types of the air-conditioning control equipment connected to the output side, the electric motor 11b of the compressor 11, the opening/closing valve 15a, the three-way valve 15b, the blower fan 17, the first pump 22, the blower 24, the second pump 26, the servomotor of the inside/outside air switching door 33a, the servomotor of the air-mix door 34, the servomotors of the blowing mode doors 38a, 38b, 38c, and the like are raised.

A group of various sensors, such as an inside air sensor, an outside air sensor, a solar radiation sensor, a cooler core temperature sensor, a discharged refrigerant temperature sensor, and an outlet refrigerant temperature sensor, are connected to an input side of the controller. The inside air sensor detects a vehicle cabin inside temperature. The outside air sensor detects the outside air temperature. The solar radiation sensor detects an amount of solar radiation in the vehicle cabin. The cooler core temperature sensor is detects a blowing-air temperature of the cooler core 27 (i.e., a cooler core temperature). The discharged refrigerant temperature sensor detects a discharged refrigerant temperature of the compressor 11. The outlet refrigerant temperature sensor detects an outlet side refrigerant temperature of the outdoor heat exchanger 16.

An operation panel that is not shown and is arranged near the dashboard at the forefront on the inside of the vehicle cabin is connected to the input side of the controller, and operation signals from various types of air-conditioning operation switches provided on the operation panel are input thereto. The various types of the air-conditioning operation switches provided on the operation panel are, for example, an actuation switch of the vehicle air-conditioner, a vehicle cabin inside temperature setting switch for setting the vehicle cabin inside temperature, and an operation mode selection switch.

In the controller, the control units for controlling the electric motor 11b of the compressor 11, the opening/closing valve 15a, the three-way valve 15b, and the like are integrally constructed, and the actuation thereof is controlled. In the controller, a configuration (hardware and software) for controlling the actuation of the compressor 11 constitutes a refrigerant discharging ability control unit. In the controller, a configuration (hardware and software) for controlling the actuation of the various equipments 15a, 15b that constitute the refrigerant channel switching section constitutes a refrigerant channel control unit.

Next, the actuation in the above configuration will be described. The vehicle air-conditioner 1 is capable of performing the heating operation for heating the inside of the vehicle cabin and the cooling operation for cooling the inside of the vehicle cabin. The actuation in each of the operations will be described hereafter.

(a) Heating Operation

The heating operation is initiated when a heating operation mode is selected by the selection switch in a state that the actuation switch on the operation panel is turned (ON). During the heating operation, the controller actuates the inside/outside air switching door 33a such that the outside air is introduced into the casing 31 from the inside/outside air switching device 33. During the heating operation, there is no need to only introduce the outside air from the inside/outside air switching device 33, but a larger volume of the outside air may be introduced than that of the inside air.

The controller closes the opening/closing valve 15a of the heat pump cycle 10 and makes the three-way valve 15b switch to the refrigerant channel that connects the outlet side of the outdoor heat exchanger 16 and the inlet side of the accumulator 18. In this way, the heat pump cycle 10 switches to the refrigerant channel through which the refrigerant flows as indicated by the solid arrows in FIG. 1.

In a configuration of the refrigerant channel, the controller reads the detection signals of the air-conditioning control sensor group and the operation signal of the operation panel. Then, the controller calculates a target blowoff temperature TAO that is a target temperature of the air to be blown into the vehicle cabin on the basis of values of the detection signals and the operation signal. Furthermore, the controller determines actuation states of the various types of the air-conditioning control equipment connected to the output side of the controller on the basis of the calculated target blowoff temperature TAO and the detection signals of the sensor group.

Then, the controller outputs determined control signals and the like to the various types of the air-conditioning control equipment. Thereafter, a control routine for reading the above-mentioned detection signals and the above-mentioned operation signal, calculating the target blowoff temperature TAO, determining the actuation states of the various air-conditioning control equipment, and outputting control voltages and the control signals is repeated at predetermined control intervals until actuation stop of the vehicle air-conditioner is requested through the operation panel. Such a control routine is basically repeated in a similar manner during the cooling operation.

In the heat pump cycle 10 during the heating operation, the high-pressure refrigerant discharged from the compressor 11 flows into the condenser 12. The refrigerant flowing into the condenser 12 exchanges heat with the coolant circulating through the first coolant circuit 21, radiates heat, and is condensed. In this way, the coolant circulating through the heater core 23 is heated.

In the heater core 23, the coolant heated in the condenser 12 is blown from the blower 24, exchanges heat with the first air and the second air passing through the evaporator 20, and radiates heat. In this way, the air to be blown into the vehicle cabin is heated.

The opening/closing valve 15a is closed. Thus, the high-pressure refrigerant flowing from the condenser 12 flows into the heating fixed throttle 13, and is expanded while being decompressed. Then, the low-pressure refrigerant, which is decompressed and expanded in the heating fixed throttle 13, flows into the outdoor heat exchanger 16. The low-pressure refrigerant flowing into the outdoor heat exchanger 16 absorbs heat from the outside air blown by the blower fan 17 and is evaporated.

The three-way valve 15b switches to the refrigerant channel that connects the outlet side of the outdoor heat exchanger 16 and the inlet side of the accumulator 18. Thus, the refrigerant flowing from the outdoor heat exchanger 16 flows into the accumulator 18 and is subjected to gas-liquid separation. Then, the gas-phase refrigerant separated in the accumulator 18 is drawn into the compressor 11 and compressed again.

As it has been described so far, the coolant circulating in the heater core 23 is heated in the condenser 12 by using a quantity of heat of the refrigerant that is discharged from the compressor 11, and the first air and the second air are heated in the heater core 23 during the heating operation. As a result, the inside of the vehicle cabin as the air-conditioning target space can be heated.

At this time, the second air that is blown from the second centrifugal multi-blade fan 24b has a lower temperature and lower humidity than the first air that is blown from the first centrifugal multi-blade fan 24a. Accordingly, the air that flows into the upper side of the merging space 36 also has a lower temperature and lower humidity than the air that flows into the lower side of the merging space 36.

Thus, the air (i.e., the air-conditioned air) that is blown from the defroster outlet toward the inside surface of the front window glass of the vehicle via the defroster opening hole 37a that communicates with an upper space of the merging space 36 also has low humidity. As a result, fogging of the front window glass of the vehicle can effectively be prevented.

Meanwhile, the air that is blown from the face outlet toward the upper body of the occupant via the face opening hole 37b that communicates with an intermediate space in a vertical direction of the merging space 36 and the air that is blown from the foot outlet toward a lower body of the occupant via the foot opening hole 37c that communicates with a lower space of the merging space 36 each have a higher temperature than the air blown from the defroster outlet. Thus, a sense of heating of the occupant can be improved.

Furthermore, a temperature of the air that is blown from the face outlet becomes lower than a temperature of the air that is blown from the foot outlet. Thus, comfortable heating that keeps a head cool and the feet warm can be realized.

(b) Cooling Operation

The cooling operation is initiated when a cooling operation mode is selected by the selection switch in a state that the actuation switch on the operation panel is turned (ON). During the cooling operation, the controller actuates the inside/outside air switching door 33a such that the inside air is introduced into the casing 31 from the inside/outside air switching device 33.

During the cooling operation, only the inside air may be introduced when the above-mentioned target blowoff temperature TAO falls in a low-temperature region or a high-temperature region, and the air volume ratio of the air volume of the outside air to the air volume of the inside air may be increased in a middle-temperature region between the low-temperature region and the high-temperature region.

The controller opens the opening/closing valve 15a and makes the three-way valve 15b switch to the refrigerant channel that connects the outlet side of the outdoor heat exchanger 16 and the inlet side of the cooling fixed throttle 19. In this way, the heat pump cycle 10 switches to the refrigerant channel through which the refrigerant flows as indicated by the solid arrows in FIG. 2.

In the heat pump cycle 10 during the cooling operation, the high-pressure refrigerant discharged from the compressor 11 flows into the condenser 12. The refrigerant flowing into the condenser 12 exchanges heat with the coolant circulating through the first coolant circuit 21, radiates heat, and is condensed. In this way, the coolant circulating in the heater core 23 is heated.

In the heater core 23, the coolant heated in the condenser 12 is blown from the blower 24, exchanges heat with the first air and the second air passing through the evaporator 20, and radiates heat. In this way, the air to be blown into the vehicle cabin is heated.

The opening/closing valve 15a is opened. Thus, the high-pressure refrigerant flowing out of the condenser 12 flows into the outdoor heat exchanger 16 via the fixed-throttle bypass passage 14.

The low-pressure refrigerant flowing into the outdoor heat exchanger 16 further radiates heat to the outside air blown by the blower fan 17. The three-way valve 15b switches to the refrigerant channel that connects the outlet side of the outdoor heat exchanger 16 and the inlet side of the cooling fixed throttle 19. Thus, the refrigerant flowing from the outdoor heat exchanger 16 is expanded while being decompressed.

The refrigerant flowing from the cooling fixed throttle 19 flows into the evaporator 20, absorbs heat from the coolant circulating in the cooler core 27, and is evaporated. In the cooler core 27, the coolant cooled in the evaporator 20 absorbs heat from the air that is blown by the blower 24 to be blown into the vehicle cabin. In this way, the air to be blown into the vehicle cabin is cooled. The refrigerant flowing from the evaporator 20 flows into the accumulator 18 and is subjected to the gas-liquid separation.

Then, the gas-phase refrigerant that is separated in the accumulator 18 is drawn into the compressor 11 and compressed again. As described above, during the cooling operation, the low-pressure refrigerant absorbs heat from the air to be blown into the vehicle cabin and is evaporated in the evaporator 20. Thus, the air to be blown into the vehicle cabin is cooled, and the inside of the vehicle cabin can be cooled.

During the cooling operation, when the occupant sets a higher temperature than the vehicle cabin inside temperature by using the vehicle cabin inside temperature setting switch, an opening degree of the air-mix door 34 is adjusted such that the temperature of the air to be blown into the vehicle cabin becomes higher than the vehicle cabin inside temperature. Even in such a case, the air to be blown into the vehicle cabin is cooled, and absolute humidity of the air to be blown into the vehicle cabin is lowered in the evaporator 20. Thus, dehumidifying and heating of the inside of the vehicle cabin can be realized.

As it has been described so far, the heating operation, the cooling operation, and a dehumidifying heating operation can be performed by switching the refrigerant channel of the heat pump cycle 10 in the vehicle air-conditioner 1 of this embodiment.

In this embodiment, the longitudinal direction of the tube 271 in the cooler core 27 and the longitudinal direction of the tube 231 in the heater core 23 are the same direction as each other. According to what has just been described, a direction in which temperature distribution of the blowing air in the cooler core 27 is generated and a direction in which temperature distribution of the blowing air in the heater core 23 is generated can be the same direction as each other.

Thus, compared to a case where the temperature distribution direction of the air blown from the cooler core 27 and the temperature distribution direction of the air blown from the heater core 23 are different directions from each other, the temperature distribution of the air-conditioned air that is obtained by the cooler core 27 and the heater core 23 can easily be adjusted.

In this embodiment, the longitudinal direction of the tube 271 in the cooler core 27 and the longitudinal direction of the tube 231 in the heater core 23 correspond to the up-down direction of the vehicle when viewed in the front-rear direction of the vehicle.

In this way, temperature distribution direction of the air-conditioned air that is obtained by the cooler core 27 and the heater core 23 can be set to the up-down direction of the vehicle. Accordingly, generation of the temperature distribution in the right-left direction of the vehicle can be restricted. Thus, a difference between a temperature of air blowing from the left-side outlet and a temperature of air blowing from the right-side outlet can be restricted. As a result, a sense of air-conditioning of the occupant can be improved.

The longitudinal direction of the tube 271 in the cooler core 27 and the longitudinal direction of the tube 231 in the heater core 23 need not strictly correspond to the up-down direction of the vehicle but may substantially correspond to the up-down direction of the vehicle when viewed in the front-rear direction of the vehicle. In other words, the longitudinal direction of the tube 271 in the cooler core 27 and the longitudinal direction of the tube 231 in the heater core 23 may be closer to the up-down direction of the vehicle than to the right-left direction of the vehicle.

In this way, the temperature distribution direction of the air-conditioned air that is obtained by the cooler core 27 and the heater core 23 can be set closer to the up-down direction of the vehicle than to the right-left direction of the vehicle. Accordingly, the generation of the temperature distribution in the right-left direction of the vehicle can be restricted. Thus, the difference between the temperature of air blowing from the left-side outlet and the temperature of air blowing from the right-side outlet can be restricted. As a result, the sense of air-conditioning of the occupant can be improved.

In this embodiment, in the path 271A of the cooler core 27 and the path 231A of the heater core 23, the coolants flow in the same direction as each other. In this way, the temperature distribution of the air blown from the cooler core 27 and the temperature distribution of the air blown from the heater core 23 can be offset. Furthermore, the temperature distribution of the air to be blown into the vehicle cabin can be restricted.

In this embodiment, the cooler core 27 and the heater core 23 are arranged across both of the first air passage 31c and the second air passage 31d that are formed in the casing 31. The longitudinal direction of the tube 271 in the cooler core 27 and the longitudinal direction of the tube 231 in the heater core 23 correspond to an alignment direction of the first air passage 31c and the second air passage 31d.

In this way, temperature distributions of both of the air-conditioned air blown into the vehicle cabin from the first air passage 31c and the air-conditioned air blown into the vehicle cabin from the second air passage 31d can easily be adjusted.

Second Embodiment

Figure 6:
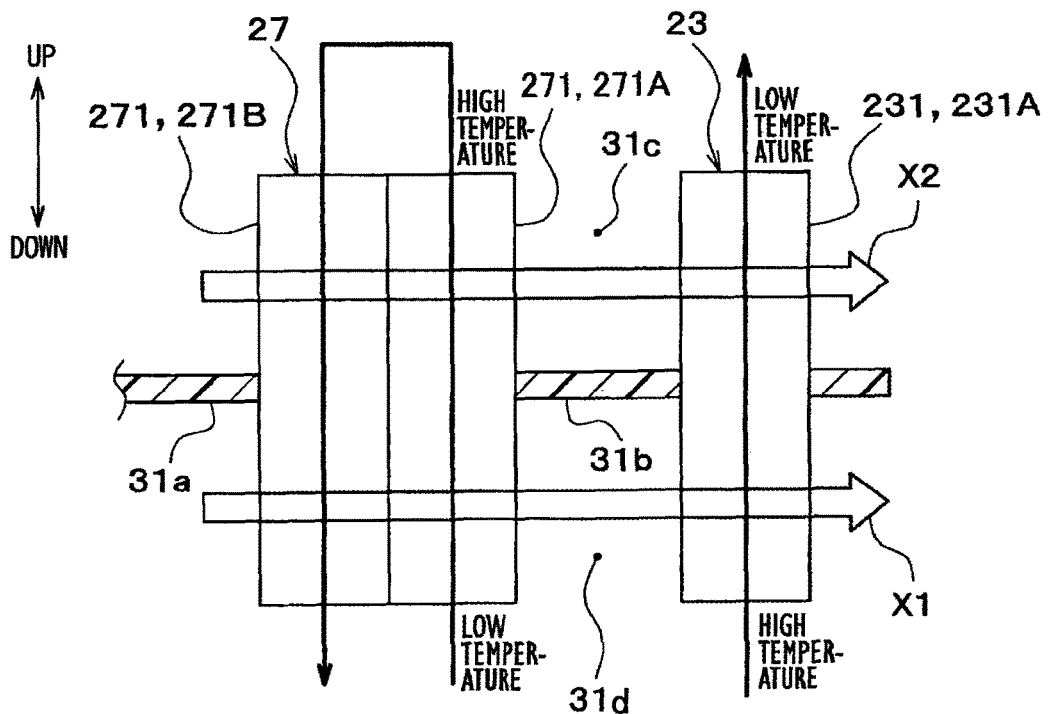
FIG. 6 is a schematic view that shows a coolant flow direction in the cooler core and the heater core in a second embodiment.

In this embodiment, as shown in FIG. 6, the plural tubes 271 of the cooler core 27 constitute the path (i.e., a downstream-side path or the first path) 271A and a path (i.e., an upstream-side path) 271B. The path 271A and the path 271B are arranged in series in the flow directions X1, X2 of the vehicle cabin inside air. The path 271A is arranged on the downstream side in the flow directions X1, X2 of the path 271B.

The coolant flows upward in the path 271A. In other words, the path 271A is configured by the plural tubes 271 (i.e., the tube group) through which the coolants flow in the same direction as each other.

The coolant flows downward in the path 271B. In other words, the path 271B is configured by the plural tubes 271 (i.e., the tube group) through which the coolants flow in the same direction as each other.

The coolant flowing into the cooler core 27 flows upward in the path 271A, flows downward in the path 271B, and flows out of the cooler core 27.

The air flowing into the cooler core 27 is cooled in the path 271B before being cooled in the path 271A. Thereafter, the air flows into the heater core 23 and is heated in the path 231A of the heater core 23. In other words, the path 231A of the heater core 23 heats the air that has been cooled in the path 271B and the path 271A of the cooler core 27.

In this embodiment, in the path 271A of the cooler core 27 and the path 231A of the heater core 23, the coolants flow in the same direction as each other. In this way, the temperature distribution of the air blown from the cooler core 27 and the temperature distribution of the air blown from the heater core 23 can be offset. As a result, the temperature distribution of the air to be blown into the vehicle cabin can be restricted.

Also in the heater core 23, similar to the cooler core 27, the tubes 231 may be arranged in two rows in the flow directions X1, X2 of the air to be blown into the vehicle cabin, and may constitute an upstream-side path and a downstream-side path.

Third Embodiment

Figure 7:
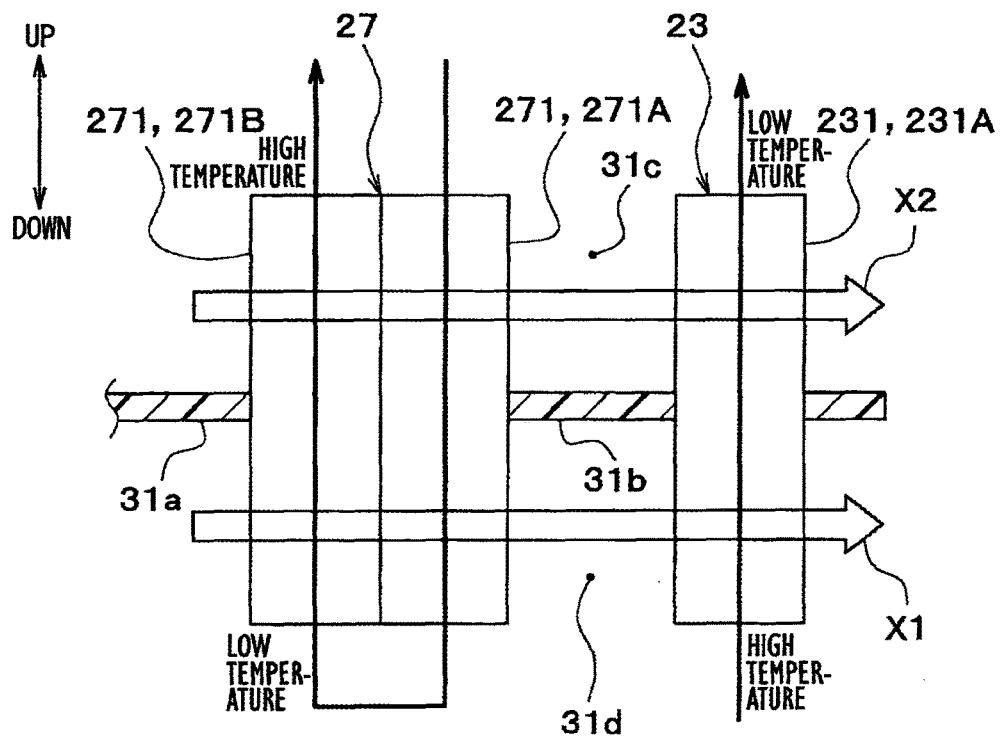
FIG. 7 is a schematic view that shows a coolant flow direction in the cooler core and the heater core in a third embodiment.

In this embodiment, as shown in FIG. 7, the flow direction of the coolant in the cooler core 27 is reversed from that in the above second embodiment. That is, the coolant flowing into the cooler core 27 flows in the path 271A, then flows upward in the path 271B (i.e., the first path), and flows out of the cooler core 27.

The air flowing into the cooler core 27 is cooled in the path 271B before being cooled in the path 271A. Thereafter, the air flows into the heater core 23 and is heated in the path 231A of the heater core 23. In other words, the path 231A of the heater core 23 heats the air that has been cooled in the path 271B and the path 271A of the cooler core 27.

In this embodiment, in the path 271B of the cooler core 27 and the path 231A of the heater core 23, the coolants flow in the same direction as each other. In this way, the temperature distribution of the air blown from the cooler core 27 and the temperature distribution of the air blown from the heater core 23 can be offset. Furthermore, the temperature distribution of the air to be blown into the vehicle cabin can be restricted.

Fourth Embodiment

Figure 8:
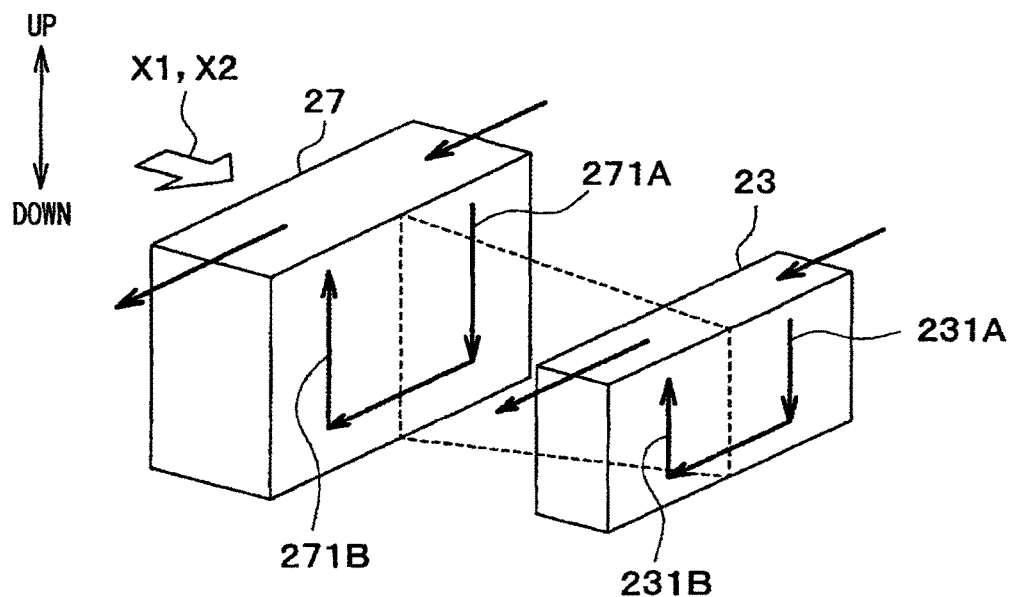
FIG. 8 is a schematic view that shows a coolant flow direction in the cooler core and the heater core in a fourth embodiment.

In this embodiment, as shown in FIG. 8, the tubes of the cooler core 27 constitute the two paths 271A, 271B (i.e., the first path). The tubes of the heater core 23 also constitute the two paths 231A, 231B (i.e., the second path).

The coolant flows downward from the above in the path 271A on the coolant flow upstream side (hereinafter, referred to as the upstream-side path) of the two paths 271A, 271B of the cooler core 27, and the coolant flows upward in the path 271B on the coolant flow downstream side (hereinafter, referred to as the downstream-side path).

The coolant flows downward from the above in the path 231A on the coolant flow upstream side (hereinafter, referred to as the upstream-side path) of the two paths 231A, 231B of the heater core 23, and the coolant flows upward in the path 231B on the coolant flow downstream side (hereinafter, referred to as the downstream-side path).

That is, in the upstream-side path 271A of the cooler core 27 and the upstream-side path 231A of the heater core 23, the coolants flow in the same direction as each other. In addition, in the downstream-side path 271B of the cooler core 27 and the downstream-side path 231A of the heater core 23, the coolants flow in the same direction as each other.

The air cooled in the upstream-side path 271A of the cooler core 27 is heated in the upstream path 231A of the heater core 23. That is, the upstream-side path 231A of the heater core 23 heats the air that has been cooled in the upstream-side path 271A of the cooler core 27.

The air cooled in the downstream-side path 271B of the cooler core 27 is heated in the downstream-side path 231B of the heater core 23. That is, the downstream-side path 231B of the heater core 23 heats the air that has been cooled in the downstream-side path 271B of the cooler core 27.

In this embodiment, in the upstream-side path 271A of the cooler core 27 and the upstream-side path 231A of the heater core 23, the coolants flow in the same direction as each other. Similarly, in the downstream-side path 271B of the cooler core 27 and the downstream-side path 231B of the heater core 23, the coolants flow in the same direction as each other.

In this way, the temperature distribution of the air blown from the cooler core 27 and the temperature distribution of the air blown from the heater core 23 can be offset. As a result, the temperature distribution of the air to be blown into the vehicle cabin can be restricted.

Other Embodiments

The above embodiments can appropriately be combined. For example, various modifications can be made to the above embodiments as follows.

(1) An example in which a tube extending in one direction is adopted as the tube 271 of the cooler core 27 has been described in the above embodiments. However, the tube 271 may be formed in a meandering shape or the like as long as at least a portion thereof extends in the up-down direction. Similarly, the tube 231 of the heater core 23 may be formed in the meandering shape or the like as long as at least a portion thereof extends in the up-down direction.

(2) A discharge port for discharging the inside air, which is introduced from the first air suction port 24c and blown from the cooler core 27, to the outside of the vehicle cabin may be formed in the casing 31 of the above embodiments.

According to what has just been described, the air to be blown into the vehicle cabin can be heated by using heat that is collected from the inside air discharged to the outside of the vehicle cabin. Thus, air-conditioning energy can be saved.

(3) In the above embodiments, the coolant is used as the heating medium flowing in the cooler core 27 and the heater core 23. However, any of various types of media, such as oil, can be used as the heating medium.

The nano fluid may be used as the heating medium. The nano fluid is a fluid in which nanoparticles with particle diameters of nanometer order are mixed. In addition to an operational effect in lowering a freezing point like the coolant (so-called the antifreeze liquid) using ethylene glycol, the following operational effects can be obtained by mixing the nanoparticles in the heating medium.

That is, an operational effect in improving thermal conductivity in a particular temperature range, an operational effect in increasing heat capacity of the heating medium, an anticorrosive effect of a metal pipe and an operational effect in preventing deterioration of a rubber pipe, and an operational effect in increasing fluidity of the heating medium at an extremely low temperature can be obtained.

Such operational effects change variously in accordance with a particle configuration, a particle shape, a compounding ratio, and an additive material of the nanoparticle.

According to what has just been described, the thermal conductivity can be improved. Thus, the equivalent cooling efficiency can be obtained even by using a heating medium in a smaller amount than the coolant using ethylene glycol.

In addition, the heat capacity of the heating medium can be increased. Thus, a cold heat storage quantity (i.e., a stored cold heat by sensible heat) of the heating medium itself can be increased.

Even in a state that the compressor 22 is not actuated, the temperature adjustment that includes cooling and heating of the equipment by using the stored cold heat can be performed for a certain duration by increasing the cold heat storage quantity. Thus, the power of the vehicle air-conditioner 1 can be saved.

An aspect ratio of the nanoparticle is preferably 50 or more. In this way, the sufficient thermal conductivity can be obtained. It should be noted that the aspect ratio is a shape index that represents a ratio of a height×a width of the nanoparticle.

As the nanoparticle, a nanoparticle that contains any of Au, Ag, Cu, and C can be used. More specifically, as a constituent atom of the nanoparticle, an Au nanoparticle, an Ag nanowire, a carbon nanotube (a CNT), graphene, a graphite core-shell structured nanoparticle (i.e., a nanoparticle in which a structure such as a carbon nanotube is present to surround the above atom), and an Au nanoparticle containing CNT, or the like can be used.

(4) In the heat pump cycle 10 of the above embodiments, the HFC-based refrigerant is used as the refrigerant. However, the type of the refrigerant is not limited to the above, and a natural refrigerant such as carbon dioxide, a hydrocarbon-based refrigerant, or the like may be used.

In addition, the heat pump cycle 10 of the above embodiments constitutes the subcritical refrigeration cycle in which the pressure of the high-pressure side refrigerant does not exceed the critical pressure of the refrigerant. However, the heat pump cycle 10 may constitute a supercritical refrigeration cycle in which the pressure of the high-pressure side refrigerant exceeds the critical pressure of the refrigerant.

What is claimed is:

1. A vehicle air-conditioner comprising: a casing forming an air passage through which air flows toward inside of a vehicle cabin; a first heat exchanger that is housed in the casing and performs a sensible heat exchange between the air flowing in the air passage and a heating medium flowing through the first heat exchanger; and a second heat exchanger that is housed in the casing and performs a sensible heat exchange between the heating medium flowing through the second heat exchanger and air that has exchanged sensible heat in the first heat exchanger, wherein the first heat exchanger and the second heat exchanger respectively have a plurality of tubes through which the heating medium flows, a longitudinal direction of the plurality of tubes of the first heat exchanger and a longitudinal direction of the plurality of tubes of the second heat exchanger are the same direction as each other, the casing includes, as the air passage, (i) an inside air passage through which inside air flows toward the inside of the vehicle cabin and (ii) an outside air passage through which outside air flows toward the inside of the vehicle cabin, the first heat exchanger and the second heat exchanger are arranged across both of the inside air passage and the outside air passage, and the longitudinal directions of the plurality of tubes of the first heat exchanger and the second heat exchanger correspond to an alignment direction of the inside air passage and the outside air passage.

2. The vehicle air-conditioner according to claim 1, wherein
the longitudinal direction of the plurality of tubes of the first heat exchanger and the second heat exchanger substantially corresponds to an up-down direction of a vehicle when viewed in a front-rear direction of the vehicle.

3. The vehicle air-conditioner according to claim 1, wherein
the longitudinal directions of the plurality of tubes of the first heat exchanger and the second heat exchanger are closer to an up-down direction of the vehicle than to a right-left direction of the vehicle.

4. The vehicle air-conditioner according to claim 1, wherein
the first heat exchanger is a cooling heat exchanger that cools the air,
the second heat exchanger is a heating heat exchanger that heats the air,
at least a part of the plurality of tubes included in the first heat exchanger forms a first path,
at least a part of the plurality of tubes, which are included in the second heat exchanger and heat the air that has been cooled in the first path, forms a second path, and
the heating medium flows in the same direction in the first path and the second path.

5. The vehicle air-conditioner according to claim 1, wherein
the first heat exchanger performs the sensible heat exchange between the air flowing in the air passage and the heating medium flowing in the first heat exchanger.

6. The vehicle air-conditioner according to claim 1, wherein
the second heat exchanger performs the sensible heat between the air, which has exchanged sensible heat with the heating medium flowing in the first heat exchanger, and the heating medium flowing in the second heat exchanger.

* * * * *